Dec. 11, 1934.  W. MILLER  1,984,227
APPARATUS FOR DEFATTING ENTRAILS
Filed Oct. 13, 1931  3 Sheets-Sheet 1
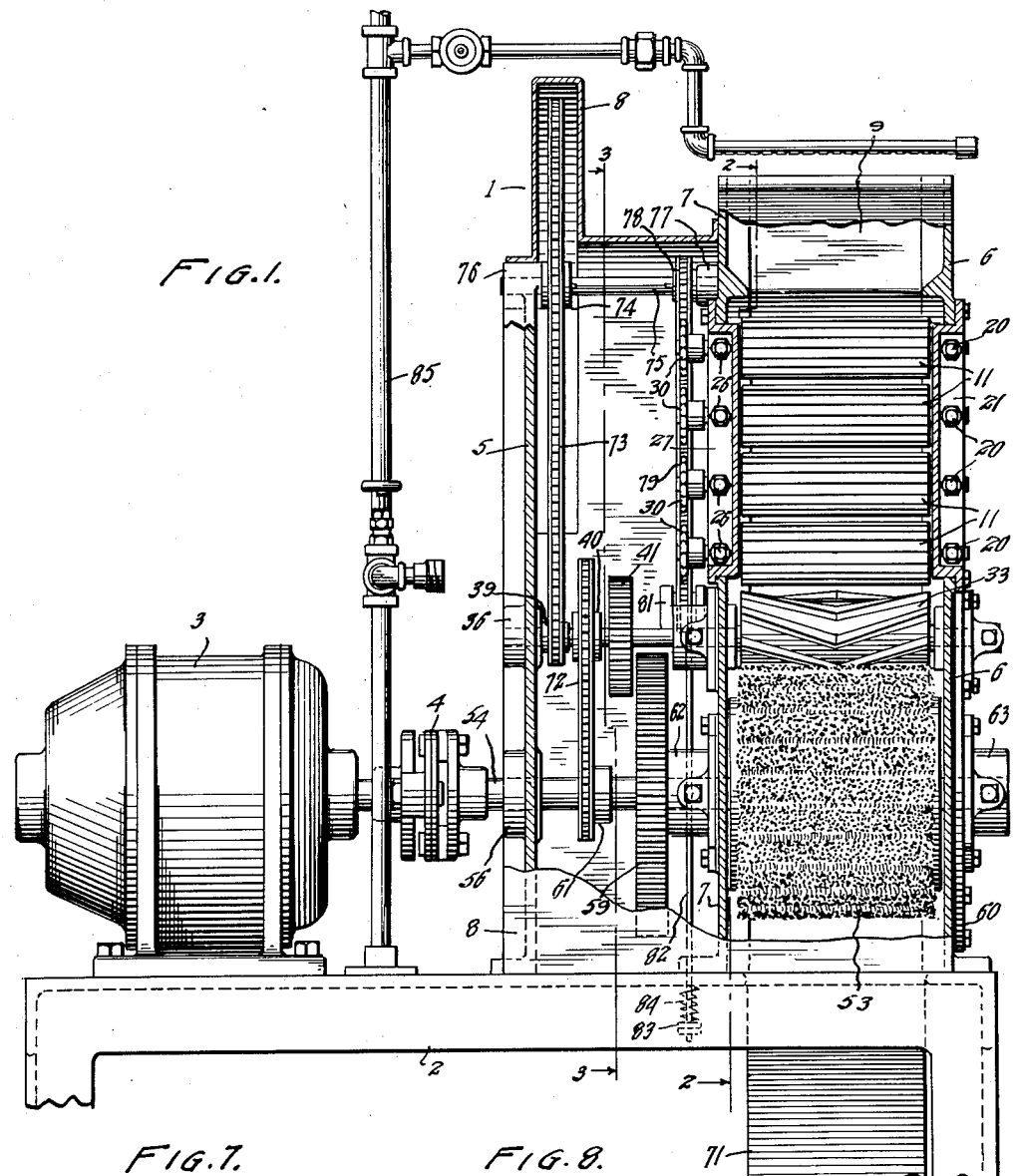

Dec. 11, 1934.　　　　W. MILLER　　　　1,984,227
APPARATUS FOR DEFATTING ENTRAILS
Filed Oct. 13, 1931　　　3 Sheets-Sheet 2
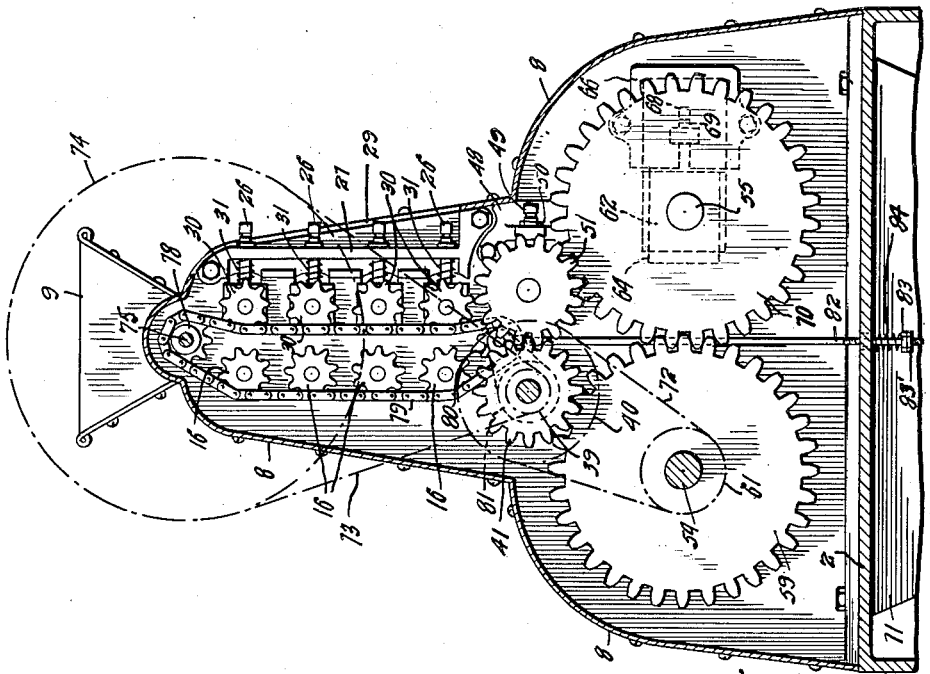

Dec. 11, 1934.  W. MILLER  1,984,227
APPARATUS FOR DEFATTING ENTRAILS
Filed Oct. 13, 1931   3 Sheets-Sheet 3
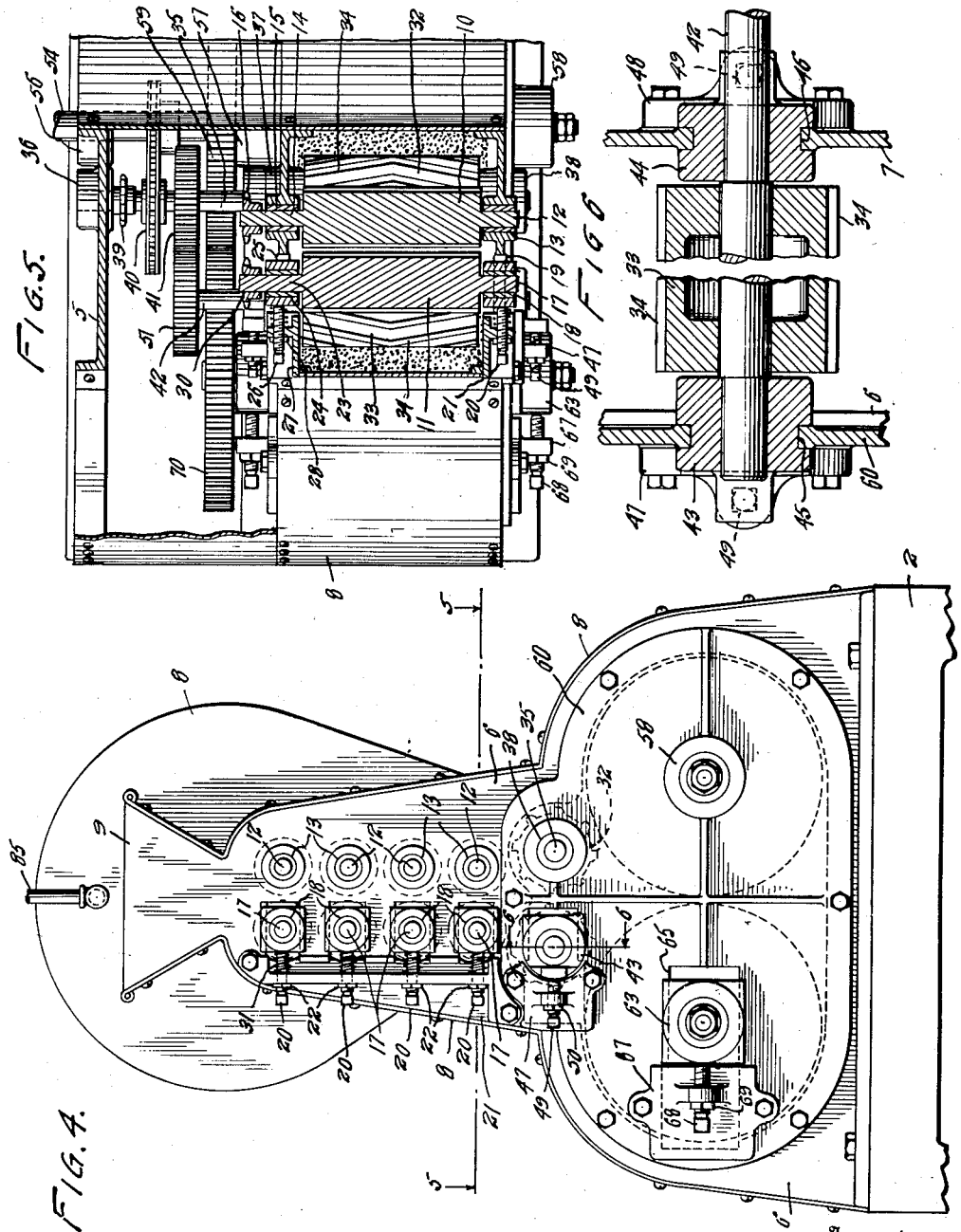
Inventor
WILLIAM MILLER
By Semmes & Semmes
Attorneys Patented Dec. 11, 1934

1,984,227

UNITED STATES PATENT OFFICE 1,984,227

APPARATUS FOR DEFATTING ENTRAILS

William Miller, Kansas City, Kans.

Application October 13, 1931, Serial No. 568,635

4 Claims. (Cl. 17—43)

This invention relates in general to the preparation of intestines for further use and more particularly has reference to a machine for removing the exterior fat from large intestines, such as the colon.

The use to which intestines from various animals may be put has long been recognized in the art and many developments have been made in apparatus for automatically removing the undesirable matter from the intestines.

In preparing the intestines so that they may be subsequently employed as casings, etc., the intestines are subjected to treatments to remove the interior material and the exterior material. In removing the interior material, which is in the nature of mucous membrane, the intestines are subjected to a treatment to loosen and finally to scrape the material from the interior. In addition to removing the material from the interior of the intestines, it is also essential to remove the exterior material, which is generally fat. The fat adheres to the exterior of the gut rather tenaciously and must be cut therefrom.

Certain of the prior art devices for cleaning intestines are equipped with means for removing the exterior fat from the intestine, but as yet, no means have been provided whereby the exterior fat from the gut may be entirely removed in a minimum of time.

A major object of the present invention is to provide a machine for removing fat and other undesirable material from the exterior of intestines.

Another object of this invention is to provide an apparatus equipped with means for removing exterior fat from the outside of a beef middle gut or large colon.

Yet another object of this invention is to provide an apparatus for removing fat from the exterior of animal intestines completely and in a minimum of time.

Still another object of this invention is to devise an apparatus for removing fat from the exterior of animal intestines, which apparatus is provided with means for fitting the intestine to a rotary cutter with a brush for removing the remaining particles of fat which are not cut from the exterior of the intestines.

A still further object of this invention is to provide a machine having a series of corrugated feed rollers for feeding an intestine to a rotary cutter having blades arranged thereon in a herring bone manner and provided with a rotary brush for removing the remainder of the fat from the intestine.

With these and other objects in view, which may be incident to my improvements, the invention consists in the parts and combination to be hereinafter set forth and claimed, with the understanding that the several necessary elements comprising my invention may be varied in construction, proportions and arrangement without departing from the spirit and scope of the appended claims.

The present invention, as hereinbefore intimated, resides in the construction of a machine for removing fat and other undesirable material from the exterior of animal intestines and especially from the beef middle gut or large colon. The present invention effects the removal of the fat from the exterior of the beef middle gut by providing a plurality of pairs of corrugated rollers for feeding the gut to a pair of rotary knives. The knives consist of rollers having a plurality of cutting blades arranged on the exterior surface in herring bone fashion. By arranging the knives on the exterior of the cutter in herring bone fashion, maintenance of the central portion of the gut in the cutter will be assured.

Upon passing from the rotary cutter the gut is next subjected to a brushing action which is effected by a pair of large rotary brushes. The brushes in revolving serve the purpose of maintaining the gut taut while being subjected to the treatment produced by the rotary knives. Also, the brushes serve to remove any excess fat which is not removed by the rotary cutter.

In order to make my invention more clearly understood, I have shown in the accompanying drawings, means for carrying the same into practical effect without limiting the improvements in their useful applications to the particular constructions, which, for the purpose of explanation, have been made the subject of illustration.

In the drawings:

Figure 1 is an elevational view partly in section illustrating a machine constructed in accordance with the present invention.

Figure 2 is a vertical sectional view taken on line 2—2 of Figure 1.

Figure 3 is a vertical sectional view taken on line 3—3 of Figure 1.

Figure 4 is a side view of the apparatus constructed in accordance with the present invention.

Figure 5 is a sectional view taken on line 5—5 of Figure 4.

Figure 6 is a sectional view of one of the rotary cutters employed in the apparatus of the present invention.

Figure 7 is an end view of a modified form of rotary cutter.

Figure 8 is a plan view of the cutter shown in Figure 7.

As shown in Figure 1, the gut cleaning machine, indicated generally at 1, may be mounted upon a suitable stand, 2. Preferably, there is also mounted upon the stand an electric motor 3, adapted to serve as a source of power for driving the machine, and operatively connected thereto by the coupling 4.

The parts of the gut cleansing machine are supported by two end frames, 5 and 6, and a central frame, 7. Secured to the flattened peripheral edges of these frames are sheet metal casing elements 8, which, together with the end frames 5 and 6, form a protective housing for the rotating parts of the machine. The upper ends of the frames 6 and 7 are so formed as to constitute, with the adjacent parts of the casing elements, a hopper 9 whereby the intestines to be cleaned may be introduced into the device.

Beneath the hopper 9 is a series of vertically spaced pairs of corrugated rollers 10, 11. Rollers 10 are provided at one end with stub shafts 12, journaled in bearings 13 of frame 6, and at their other end with shafts 14, extending through the bearings 15 in frame 7 and provided at their ends with sprocket wheels 16. The vertically aligned rollers 10 are thus rotatably held in a definite position between frames 6 and 7. In order to accommodate intestines of various sizes, the other rollers, 11, are provided with means whereby they may be adjustably moved toward or away from the cooperating rollers 10. To this end, the stub shafts 17 extending from one end of the rollers 11 are journaled in bearings in the blocks 18, which are slidably mounted in horizontal slots 19 in the frame 6. Blocks 18 may be positioned in their desired horizontal position by a series of set screws 20, mounted in plate 21 secured to frame 6, and provided with lock nuts 22. Similar provisions are made at the other ends of rollers 11, stub shafts 23 being journaled in blocks 24, slidable in slots 25 of the frame 7. Set screws 26 mounted in plate 27 attached to frame 7, and provided with lock nuts 28, constitute means whereby the blocks 18 may be adjusted to the horizontal position desired. To permit access to these set screws, a slot 29 is provided in the adjacent casing element 8. The extremities of the shafts 23 are provided with sprocket wheels 30. Springs 31 are provided about the set screws 20 and 26, to resiliently urge the rollers 11 towards the rollers 10.

Positioned beneath the corrugated rollers are two cutters 32 and 33. These cutters are of general cylindrical form, and have cutting edges 34 extending longitudinally thereof. Preferably, these cutting edges extend obliquely from the ends to the center in a flat V-shaped or herring bone arrangement, as shown in Figures 1 and 5, to centralize the gut passing through the machine, and to insure a smoother cutting action.

Cutter 32 is non-rotatably mounted on shaft 35, journaled in the bearings 36, 37 and 38 of the frames 5, 7 and a plate 60 secured to frame 6, respectively. Also non-rotatably mounted on shaft 35 are a small sprocket wheel 39, a large sprocket wheel 40 and a gear 41. The cutter 33 is non-rotatably mounted on shaft 42, journaled in blocks 43, 44, horizontally slidable in slots 45, 46 of the plate 60 and frame 7, respectively. Positioned upon plate 60 and frame 7 are plates 47, 48, respectively, provided with set screws 49 whereby the blocks 43, 44 may be moved in their slots and the cutter 33 adjusted relative to cutter 32. Nuts 50 are provided on the set screws to hold them in proper position. Shaft 42 extends through block 44, and at its extremity is provided with a gear 51, meshing with gear 41.

Beneath the cutters are positioned a pair of cylindrical brushes, 52, 53, non-rotatably mounted on shafts 54, 55, respectively. Shaft 54 is journaled in the bearings 56, 57, and 58, in frames 5 and 7 and plate 60, respectively. Also non-rotatably mounted on shaft 54 are a gear wheel 59 and a sprocket wheel 61, and the shaft 54 is connected, through coupling 4, to the shaft of the motor 3. Shaft 55 is journaled in blocks 62 and 63 slidably mounted in slots 64, 65 of the frame 7 and plate 60, respectively. Plates 66 and 67, secured respectively to frame 7 and plate 60, are provided with set screws 68 whereby the blocks and rotary brush 53 may be horizontally adjusted. Nuts 69 are provided to hold the set screws in the desired position. A gear 70, meshing with gear 59, is non-rotatably mounted on shaft 55. Beneath the brushes 52, 53 is a hopper 71, mounted in an opening in the stand 2.

From the above description, it will be seen that the motor 3 drives shaft 54, through the coupling 4, to rotate the brush 52. The gear 59, mounted on shaft 54, meshes with and turns gear 70 on shaft 55 to rotate brush 53 at the same rate of speed as brush 52 but in the opposite direction. The sprocket wheel 61 on shaft 54 is connected with the sprocket wheel 40 on shaft 35 by a chain 72, thus delivering power from shaft 54 to shaft 35 to rotate the cutter 32. Gear 41 on shaft 35 meshes with and turns gear 51 on shaft 42, whereby the cutter 33 is turned in the opposite direction to cutter 32, but at the same rate of speed.

A chain 73 connects the sprocket wheel 39 on shaft 35 to a sprocket wheel 74 on shaft 75, journaled in bearings 76 and 77 in frames 5 and 7, respectively, whereby power is delivered to shaft 75. Non-rotatably mounted on shaft 75 is a sprocket wheel 78, over which a chain 79 passes, delivering power, as shown in Figure 3, to sprocket wheels 16 and 30, to turn the corrugated rollers 10 and 11 at the same speed, but in opposite directions. To allow for the adjustment of rollers 11, a sprocket wheel 80 is provided to act as a take-up for the slack in chain 79. This wheel 80 is mounted in an arm 81 movably mounted on frame 7, co-axially with shaft 35. A rod 82 attached to arm 81 extends downwardly through the top of the stand 2, and is provided with a nut 83 and lock nut 83' at its end, which is threaded. A spring 84 extends around rod 82, bearing at one end on the top of the stand 2 and at its other end against nut 83, whereby rod 82, and consequently sprocket wheel 80 are resiliently urged downwardly, taking up the slack in chain 79.

The method of operating the machine is believed to be obvious from the above description. In practice, the motor 3 is started, setting the parts in motion and an intestine to be de-fatted is introduced into hopper 9 and between the upper set of corrugated rollers 10 and 11. These rollers carry the intestine downwardly through the remaining pairs of rollers 10 and 11, which feed the intestine to the cutters 33 and 34. The pairs of rollers 10 and 11 insure the feeding of the intestine to the cutters at the proper rate of speed, and are corrugated to prevent the rolling out or injury to the mucous membrane inside the intestine. The cutters then cut off the fat and other tissues adhering to the exterior of the intestines. The cutting edges run obliquely from the ends of the roll to the center, thus centralizing the gut on its journey through the machine. In addition, the oblique arrangement of the cutting edges provides for a smooth and gradual cutting of the fat, avoiding the danger of breakage. The gut then passes down through the rotary brushes which remove whatever loose particles of fat that may be left thereon. The brushes also provide means whereby the gut is held at the right degree of tautness as it passes between the cutters, and are so placed as to clean off the fat which might otherwise collect on cutters 33 and 34. Adjustments provided for rollers 11, cutter 33 and brush 53, enable the de-fatting of guts of various sizes, and the device, largely because of this feature, is particularly useful in de-fatting the beef middle gut or large colon.

Pipe connections, as at 35, are provided adjacent the machine whereby a suitable cleansing medium, such as water or steam, may be used to clean the device after use.

Figures 7 and 8 show a modified form of cutter, wherein a roll 86, adapted to be non-rotatably secured to shaft 35 or 42, carries removable knife elements 87, secured to the roll by pins 88. This permits the use of different materials for the roll 86 and knife elements 87, enabling materials particularly adapted for these respective elements to be used therefor, and also permits the removal or replacement of the knife elements.

From the foregoing description, it will be appreciated that I have provided a machine which operates very satisfactorily to remove the exterior fat from the outside of a beef middle gut or large colon. By providing the feed rollers with corrugations and maintaining the rollers of each pair a sufficient distance apart, the mucous membrane contained in the intestine will not be disturbed or rolled out while undergoing the defatting operation. Also, the oblique knives positioned on the exterior of the rotary cutter will serve to attack the fat on the exterior of the gut in a slicing manner, thereby avoiding danger of breaking the gut. Furthermore, by positioning the knives on the exterior of the cutters in the herring bone arrangement, as hereinbefore described, the gut will at all times be properly centered so as to be in a position to be most satisfactorily operated upon by the knives.

By so constructing the machine as hereinbefore described, the combination of elements cooperate to insure the complete defatting of the exterior of the intestine in a minimum of time, which was not possible with the prior art apparatus.

While I have shown and described the preferred embodiment of my invention, I wish it to be understood that I do not confine myself to the precise details of construction herein set forth by way of illustration, as it is apparent that many changes and variations may be made therein, by those skilled in the art without departing from the spirit of the invention, or exceeding the scope of the appended claims.

I claim:

1. An apparatus for removing fat from the exterior of entrails comprising a plurality of pairs of corrugated rollers, a rotary cutter for cutting the fat from the entrails fed thereto by the corrugated rollers and a pair of rotary brushes adapted to receive the de-fatted entrails from the rotary cutter and to remove the remaining fat therefrom.

2. An apparatus for removing fat from the exterior of entrails comprising a plurality of pairs of corrugated rollers, the rollers of each pair being spaced apart a sufficient distance to avoid removal of the mucous membrane from the interior of the entrails, a rotary cutter for cutting the fat from the entrails fed thereto by the corrugated rollers and a pair of rotary brushes adapted to receive the de-fatted entrails from the rotary cutter and to remove the remaining fat therefrom.

3. An apparatus for removing fat from the exterior of entrails comprising a plurality of pairs of corrugated rollers, the rollers of each pair being spaced apart a sufficient distance to avoid removal of the mucous membrane from the interior of the entrails, a rotary cutter for cutting the fat from the entrails fed thereto by the corrugated rollers, a pair of rotary brushes adapted to receive the de-fatted entrails from the rotary cutter and to remove the remaining fat therefrom, and means for operating the brushes at a greater peripheral speed than the cutter.

4. An apparatus for removing fat from the exterior of entrails comprising a plurality of corrugated rollers, a rotary cutter for cutting the fat from the entrails fed thereto by the corrugated rollers, such cutter being positioned beneath the rollers, and a pair of rotary brushes below the cutter adapted to receive the de-fatted entrails from the rotary cutter and to remove the remaining fat therefrom.

WILLIAM MILLER.